US009820084B2

(12) United States Patent
Palin et al.

(10) Patent No.: US 9,820,084 B2
(45) Date of Patent: Nov. 14, 2017

(54) SERVICE DATA PROVISION

(71) Applicant: Nokia Technologies Oy, Espoo (FI)

(72) Inventors: Arto Palin, Viiala (FI); Jukka Reunamaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/109,853

(22) PCT Filed: Dec. 29, 2014

(86) PCT No.: PCT/FI2014/051056
§ 371 (c)(1),
(2) Date: Jul. 6, 2016

(87) PCT Pub. No.: WO2015/104452
PCT Pub. Date: Jul. 16, 2015

(65) Prior Publication Data
US 2016/0337787 A1 Nov. 17, 2016

(30) Foreign Application Priority Data
Jan. 9, 2014 (GB) .................................. 1400314.9

(51) Int. Cl.
H04W 4/00 (2009.01)
G06Q 30/02 (2012.01)

(52) U.S. Cl.
CPC ........ *H04W 4/008* (2013.01); *G06Q 30/0267* (2013.01); *H04W 4/001* (2013.01)

(58) Field of Classification Search
CPC ... H04W 4/008; H04W 4/001; G06Q 30/0267
See application file for complete search history.

(56) References Cited

U.S. PATENT DOCUMENTS 7,158,756 B2 * 1/2007 Palin ...................... H04L 63/18
380/270
8,209,426 B2 6/2012 Simonen et al.
(Continued)

FOREIGN PATENT DOCUMENTS

EP 1492302 A2 12/2004
EP 2421304 A1 2/2012
(Continued)

OTHER PUBLICATIONS

International Search Report and Written Opinion received for corresponding Patent Cooperation Treaty Application Na PCT/FI2014/051056, dated Mar. 18, 2015, 16 pages.
(Continued)

*Primary Examiner* — Ping Hsieh
(74) *Attorney, Agent, or Firm* — Banner & Witcoff, Ltd.

(57) ABSTRACT

A technique for providing service data is provided. According to an example embodiment, the technique comprises operating, in a user apparatus, a first wireless communication portion for short-range wireless communication and a second wireless communication portion for wireless communication, providing, in response to receiving a list of allowable device identifiers from a remote server apparatus via the second wireless communication portion, said list of allowable device identifiers to the first wireless communication portion, and issuing, in response to the first wireless control portion receiving an advertising message comprising a device identifier included in said list of allowable device identifiers, an advertising report including at least one of the received device identifier and a service identifier associated with the received device identifier.

20 Claims, 6 Drawing Sheets

(56) References Cited

U.S. PATENT DOCUMENTS

| | | |
|---|---|---|
| 2009/0093232 A1 | 4/2009 | Gupta et al. |
| 2009/0094351 A1 | 4/2009 | Gupta et al. |
| 2014/0362728 A1 | 12/2014 | Krochmal |
| 2014/0378058 A1* | 12/2014 | Decuir .................. H04W 4/008 455/41.2 |

FOREIGN PATENT DOCUMENTS

| | | |
|---|---|---|
| EP | 2744247 A1 | 6/2014 |
| WO | 2013173270 A2 | 11/2013 |

OTHER PUBLICATIONS

Jul. 28, 2017—(EP) Extended EP Search Report—App 14878299.8.

\* cited by examiner

SERVICE DATA PROVISION

RELATED APPLICATION

This application was originally filed as Patent Cooperation Treaty Application No. PCT/FI2014/051056 filed Dec. 29, 2014 which claims priority benefit to GB Patent Application No. 1400314.9, filed Jan. 9, 2014.

TECHNICAL FIELD

The example and non-limiting embodiments of the present invention relate to service discovery and service advertisements in context of short-range wireless communication.

BACKGROUND

Users of mobile devices are increasingly willing to apply their mobile devices to receive information locally available in their immediate surroundings, while on the other hand many service providers indicate increasing interest, or even need, to make such information available to the users. Examples of such locally available, and typically (predominantly) locally relevant, information includes environmental information concerning the immediate surroundings (e.g. temperature, air humidity, $CO_2$ level, . . . ), other pieces of status information regarding the immediate surroundings (e.g. the estimated number of people in a certain space/area) and commercial information concerning services available in the immediate surroundings.

Short-range wireless techniques or protocols provide a suitable platform for broadcasting such information to the mobile devices residing in or visiting a certain geographical area or space. Any outdoor area or indoor area/space typically occupied by a high number of people is likely to provide an environment that is suitable for using such techniques/protocols for delivery of information to the users of mobile devices. Examples of such areas/spaces include shopping centers or shopping malls, theme parks, museums, airports, railway stations, public buildings, busy pedestrian streets or areas. On the other hand, certain types of locally relevant information may also be useful in more private environments such as private homes.

However, with the increasing amount of information being made wirelessly available for the users of the mobile devices, the risk of the potentially useful information getting lost in the vast amount of information available out there is also increasing. Moreover, there is also a significant risk of some users refusing to receive any information due to overflow of information, most of which is likely to be irrelevant for a given individual user.

SUMMARY

According to a first example embodiment, an apparatus is provided, the apparatus comprising a first wireless communication portion for short-range wireless communication, a second wireless communication portion for wireless communication, and at least one processor and at least one memory including computer program code for one or more programs, the at least one memory and the computer program code configured to, with the at least one processor, cause the apparatus at least to provide a control portion for operating the first and second wireless communication portions, wherein the control portion is configured to provide, in response to receiving a list of allowable device identifiers from a remote server apparatus via the second wireless communication portion, said list of allowable device identifiers to the first wireless communication portion, and wherein the first wireless communication portion is configured to provide, in response to receiving an advertising message comprising a device identifier included in said list of allowable device identifiers, the control portion with an advertising report including at least one of the received device identifier and a service identifier associated with the received device identifier.

According to a second example embodiment, an apparatus is provided, the apparatus comprising. first wireless communication means for short-range wireless communication, second wireless communication means for wireless communication, and control means for controlling the first and second wireless communication portions, wherein the control means is configured to provide, in response to receiving a list of allowable device identifiers from a remote server apparatus via the second wireless communication means, said list of allowable device identifiers to the first wireless communication means, and wherein the first wireless communication means is configured to provide, in response to receiving an advertising message comprising a device identifier included in said list of allowable device identifiers, the control means with an advertising report including at least one of the received device identifier and a service identifier associated with the received device identifier.

According to another example embodiment, an apparatus is provided, the apparatus comprising means for obtaining pre-stored user preferences associated with a user apparatus, means for applying predetermined mapping between a predetermined set of device identifiers and corresponding possible user preferences to generate a list including those device identifiers that map to said pre-stored user preferences, and means for providing said list as a list of allowable device identifiers to the user apparatus in response to an indication regarding the user apparatus having entered an area of interest.

According to another example embodiment, an arrangement is provided, the arrangement comprising an apparatus according to the first or second example embodiment, and a server apparatus comprising at least one processor and at least one memory including computer program code for one or more programs, the at least one memory and the computer program code configured to, with the at least one processor, cause the server apparatus at least to provide said list of allowable device identifiers to the user apparatus for reception via said second wireless communication portion in response to an indication regarding the user apparatus having entered an area of interest.

According to another example embodiment, a method is provided, the method comprising operating, in a user apparatus, a first wireless communication portion for short-range wireless communication and a second wireless communication portion for wireless communication, providing, in response to receiving a list of allowable device identifiers from a remote server apparatus via the second wireless communication portion, said list of allowable device identifiers to the first wireless communication portion, and issuing, in response to the first wireless control portion receiving an advertising message comprising a device identifier included in said list of allowable device identifiers, an advertising report including at least one of the received device identifier and a service identifier associated with the received device identifier.

According to another example embodiment, a computer program is provided, the computer program including one or more sequences of one or more instructions which, when executed by one or more processors, cause a wireless communication apparatus at least to operate, in a user apparatus, a first wireless communication portion for short-range wireless communication and a second wireless communication portion for wireless communication, to provide, in response to receiving a list of allowable device identifiers from a remote server apparatus via the second wireless communication portion, said list of allowable device identifiers to the first wireless communication portion, and to issue, in response to the first wireless control portion receiving an advertising message comprising a device identifier included in said list of allowable device identifiers, an advertising report including at least one of the received device identifier and a service identifier associated with the received device identifier.

The computer program referred to above may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
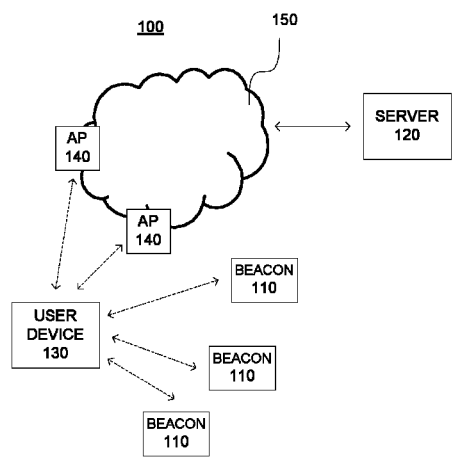
FIG. 1 schematically illustrates some entities of a wireless communication arrangement according to an example embodiment.

FIG. 1 schematically illustrates some components or entities of a wireless communication arrangement 100 to depict an exemplifying framework for various embodiments of the present invention. The wireless communication arrangement 100 includes beacon devices 110, representing one or more beacon devices, which may be jointly referred to as the beacon device(s) 110. The beacon device(s) are arranged in suitable positions within a predetermined area/space of interest (as will be described later in this text in more detail). In the following, for clarity and brevity of description, the beacon devices 110 are mostly described with a reference to a single beacon device 110. The beacon device 110 is arranged to broadcast one or more predetermined advertisement messages or advertising events according to a certain schedule. The advertising messages/events are arranged to provide information regarding one or more services, as will be described in detail later in this text. The beacon device 110 may also be referred to as an advertising device or a discoverable device, and these terms may be interchangeably used in the following. Moreover, the beacon device 110 may also be referred to as a beacon apparatus.

FIG. 1 further depicts a user device 130, representing one or more user devices, which may be jointly referred to as the user device(s) 130. One or more user devices 130 may (temporarily) reside or move within the area/space of interest, in other words within the operating range of at least some of the beacon devices 110. In the following, for clarity and brevity of description, the user devices 130 are mostly described with a reference to a single user device 130. The user device 130 is capable of receiving the advertising messages or events originating from the beacon device(s) 110 and presenting information received in an advertising message/event for user of the respective user device 130. The user device 130 may also be referred to as a scanning device or a discovering device, and these terms may be interchangeably used in the following. The user device 130 may also be referred to as a user apparatus 130.

The wireless communication arrangement 100 may further include one or more server devices, represented in FIG. 1 by a server device 120. Alternatively, the corresponding function may be provided by a plurality of devices, jointly operating as the server device 120. The server device 120 is capable of communicating with the user devices 130 and it is arranged to provide the user device(s) 130 with information that facilitates efficient managing or handling of the advertising messages/events therein. Moreover, the server device 120 may be arranged to provide (additional) service information on basis of service information received in an advertising message/event from the beacon device 110 for presentation to the user of the user device 130. The server device 120 may be referred to as a server apparatus 120.

Figure 2:
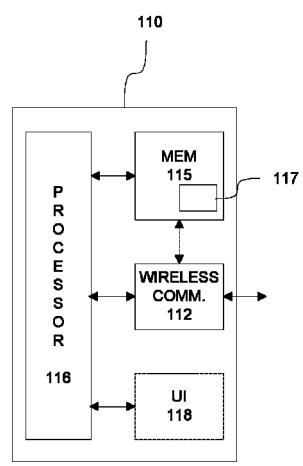
FIG. 2 schematically illustrates some components of an exemplifying beacon device according to an example embodiment.

The beacon device 110 is, preferably, a device arranged or installed in its location in a fixed manner. In other words, the beacon device 110 is typically a stationary, fixed and/or immobile device. FIG. 2 schematically illustrates some components of an exemplifying beacon device 110. The beacon device 110 comprises a wireless communication portion 112 for communicating with other devices using a short-range wireless communication technique or protocol for a point-to-point or point-to-multipoint connection. The beacon device 110 is hence capable of communicating with other devices equipped with means for wireless communication using the same technique/protocol. The wireless communication portion 112 may be considered as a wireless communication apparatus included in (or hosted by) the beacon device 110.

The beacon device 110 further comprises a memory 115 for storing data and program code 117 and a processor 116. The beacon device 110 may further comprise a user interface 118 for receiving input from a user and/or providing output to the user. The processor 116 may be arranged to control operation of the beacon device 110 e.g. in accordance with the program code 117 stored in the memory 115, in accordance with the user input received via the user interface 118 and/or in accordance with information received via the wireless communication portion 112. The memory 115 and the program code 117 stored therein may be further arranged to, with the processor 116, to control operation of the wireless communication portion 112, possibly together with a control portion that may be provided within the wireless communication portion 112 (as will be described in more detail later in this text). The beacon device 110 may comprise further components or portions in addition to those depicted in FIG. 2, e.g. a second communication portion for communicating with other devices independently of the wireless communication portion 112, e.g. a wireless communication portion that is capable of communicating with a second communication portion of the user device 130 (which is described hereinafter).

Typically, a set of a plurality of beacon devices 110 is arranged in a certain geographical area or in a certain space for broadcasting advertising messages/events related to a certain service. This area or space may be, for example, a shopping center or a shopping mall, a theme park, a museum, an airport, a railway station, a public building, a busy pedestrian street or area, a private home, etc. or a certain portion thereof. The service associated with the advertising messages/events is typically, although not necessarily, a service available within the area/space and/or in immediate vicinity thereof. There may be a plurality of sets of beacon devices 110 serving the area/space, each set pertaining to its dedicated service. Alternatively, a single set of beacon devices may be arranged to broadcast advertising messages/events pertaining to a number of services instead of being dedicated for broadcasting advertising messages pertaining to a single service.

Figure 3:
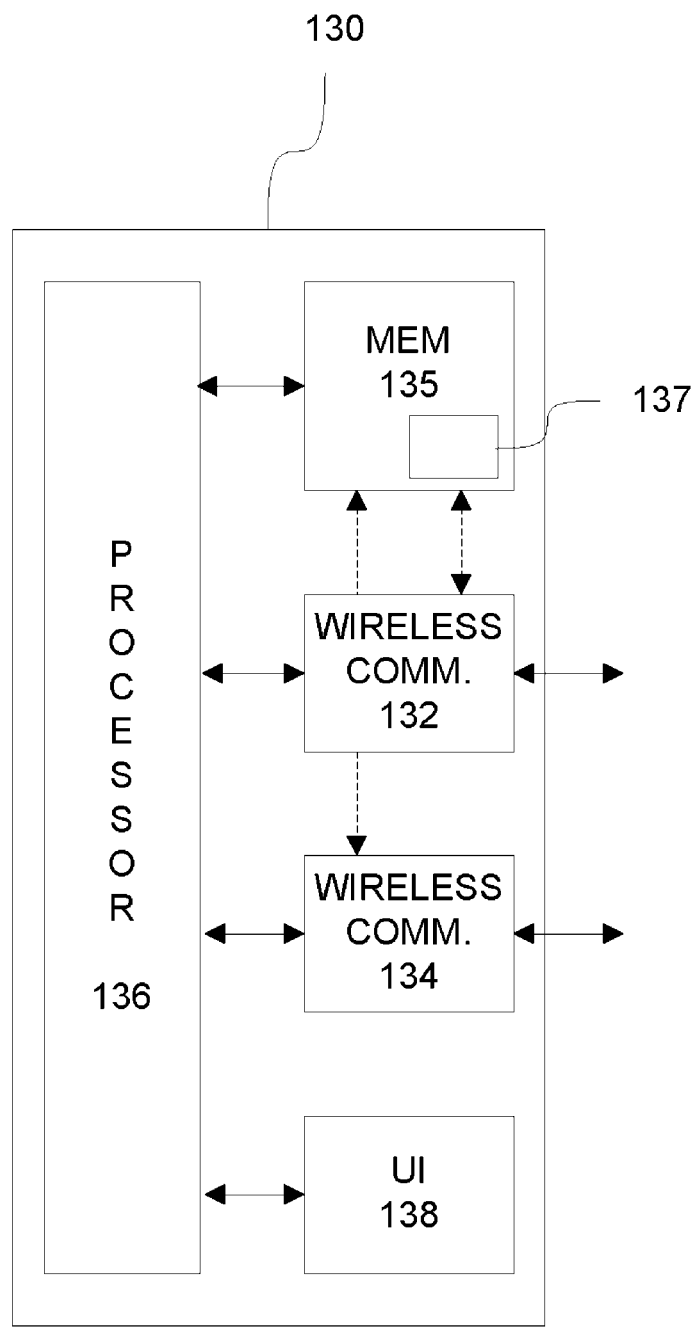
FIG. 3 schematically illustrates some components of an exemplifying user device according to an example embodiment.

The user device 130 is a mobile device, carried by a user residing in or visiting the area/space served by the beacon device 110 (or a set of beacon devices 110). FIG. 3 schematically illustrates some components of an exemplifying user device 130. The user device 130 comprises a wireless communication portion 132 similar to the wireless communication portion 112, thereby enabling the short-range wireless communication between the beacon device 110 and the user device 130 for exchange of information therebetween. Along the lines described for the wireless communication portion 112, the wireless communication portion 132 may be considered as a wireless communication apparatus included in (or hosted by) the user device 130 (or the second apparatus 130). The user device 130 further comprises at least a second wireless communication portion 134 for communicating with other devices using a wireless communication technique or protocol different from that employed by the wireless communication portion 132. The second wireless communication portion 134 may enable local area wireless communication and/or wide area wireless communication using a suitable wireless communication technique or protocol. Examples of techniques/protocols employed by the second wireless communication portion 134 include cellular wireless communication techniques/protocols and wireless local area networks (WLANs) according to an IEEE 802.11 specification (where IEEE stands for the Institute of Electrical and Electronics Engineers).

The user device 130 further comprises a memory 135 for storing data and program code 137, a processor 136 and a user interface 138 for receiving input from a user and/or providing output to the user. The processor 136 may be arranged to control operation of the user device 130 in accordance with the program code 137 stored in the memory 135 and possibly further in accordance with the user input received via the user interface 138 and/or in accordance with information received via one of the wireless communication portions 132, 134. The memory 135 and the program code 137 stored therein may be further arranged to, with the processor 136, to control operation of the wireless communication portion 132, 134, possibly together with a control portion that may be provided within the respective wireless communication portion 132, 134 (as will be described in more detail later in this text). The user device 130 may comprise further components or portions in addition to those depicted in FIG. 3.

Each of the wireless communication portions 112, 132, 134 may be provided e.g. as a respective chipset and/or as a respective communication module. For clarity and brevity of description, each of the wireless communication portions 112, 132, 134 is considered as a single logical portion that is also able to process the information received via the wireless connection and/or that is to be transmitted via the wireless connection and that is able to exchange data and control information with other entities or components of the device 110, 130 hosting the respective wireless communication portion 112, 132, 134. In this regard, each of the wireless communication portions 112, 132, 134 may comprise e.g. a wireless transceiver portion for wireless communication with other devices, a host interface for exchanging data and control information with other components or entities of the respective device 110, 130 (e.g. the processor 116, 136) and a control portion for processing information received/transmitted via the wireless transceiver portion. Such a control portion may be provided by hardware means, by software means or by combination of hardware means and software means. The communication portion 112, 132, 134 may further comprise e.g. a memory for storing information. As an example, the control portion may be provided e.g. as a processor and the memory may include a computer program code, and the memory and the computer program code may be configured to, with the processor, control operation of the respective wireless communication portion 112, 132, 134, possibly together with the processor 116, 136 of the respective device 110, 130.

The server device 120 is typically a stationary or fixed device that is capable of communicating with the user device(s) 130. The server 120 may comprise a wireless communication portion arranged to employ the same communication protocol/technique as the second wireless communication portion 134 of the user device 130, thereby making the server device 120 directly capable of engaging into wireless communication with the user device 130. However, in a typical scenario the server 120 is connected via a network 150 to one or more wireless access points 140 (e.g. WLAN access points) arranged within the same area/space occupied by the beacon devices 110, where each of the access points 140 hosts respective wireless communication portion for wireless communication with the second communication portion 134 in order to enable connection between the server device 120 and the user device 130. As a variation of this approach, instead of the wireless access points 140 arranged in the above-mentioned area/space of interest, the network 150 may connect the server device 120 to a base station of a wireless cellular communication network (e.g. GSM, GERAN, UTRAN, LTE, CDMA200, EV-DO, etc.) hosting the respective wireless communication portion, where the above-mentioned area/space falls within the coverage area of said base station, thereby enabling connection between the server device 120 and the user device 130.

The wireless communication portion employed to connect the server device 120 with the user device 130 may be similar to the wireless communication portion 134 of the user device 130, operation which may be at least in part controlled by a control portion (e.g. a processor arranged to execute program code stored in a memory) of the device hosting the wireless communication portion.

As described above, the second wireless communication portion 134 of the user device 130 may be arranged to apply wireless cellular communication and/or wireless local area networks (e.g. WLAN) to enable communication with the server device 120. The second wireless communication portion 134 may be considered to provide a generic network access for the user device, enabling e.g. access to the internet via a respective access network.

In contrast, the wireless communication portions 112, 132 are arranged to apply a short-range wireless communication technique/protocol. The term short-range wireless communication as used herein refers to wireless communication techniques or protocols that enable operational range in scale of tens of meters, e.g. up to 100 meters. However, the useable operational range may vary in dependence of usage environment. For example in an indoor environment, the useable operational range of such short-range wireless communication technique/protocol may be substantially shorter, e.g. only a few tens of centimeters, due to walls and/or other fixed structures that are likely to partially block or interfere with the radio communication. On the other hand, in line-of-sight conditions (e.g. outdoors) where walls or other fixed structures do not block or interfere with the radio communication, the useable operational range may be over 150 meters.

While a number of short-range wireless communication techniques/protocols are known in the art, in the following, some aspects of various embodiments of the present invention are described with references to the Bluetooth Low Energy (BLE) protocol. However, the BLE serves as an illustrative and non-limiting example in this regard, and the description generalizes into any wireless communication protocol where the first device 110 and the second device 130 are capable of establishing a wireless point-to-point connection therebetween on basis of the beacon device 110 advertising its presence to the user device 130 (and to other scanning devices), as will be described in the following in more detail.

BLE operates in the unlicensed 2.4 GHz ISM band, in the same manner as does the Bluetooth Basic Rate/Enhanced Data Rate (BR/EDR). BLE supports data packets from 10 octets to a maximum of 47 octets, thereby providing a low duty cycle. BLE employs a frequency hopping transceiver with many frequency hopping spread spectrum (FHSS) carriers, with a gross air data rate of 1 Megabit per second (Mb/s).

BLE is designed for applications that do not require high data rates and/or low latency, but which may benefit from a very-low power idle mode, a simple device discovery, and short data packets. BLE protocol allows a star network topology in connections, where one device may serve as a master for a plurality of slave devices. The master device dictates the connection timing and communication operations of the one or more slave devices. BLE communicates over a total of 40 RF channels, separated by 2 MHz. Data communication between BLE devices occurs in 37 pre-specified data channels of the 40 RF channels. All data connection transmissions occur in connection events wherein a point-to-point connection is established between the master device and a slave device. In the BLE protocol, a slave device may provide data through BLE communication to the master device to which it is connected and vice versa. The remaining 3 channels of the 40 RF channels are advertising channels used by devices to advertise their existence and capabilities. The BLE protocol defines a unidirectional connectionless broadcast mode on the advertising channels. A TDMA based polling scheme is used in which one device transmits a packet at a predetermined time and a corresponding device responds with a packet after a predetermined interval.

The physical channel is sub-divided into time units known as events. Data is transmitted between BLE devices in packets that are positioned in these events. There are two types of events: Advertising events and Connection events. Devices that transmit advertising packets on the advertising Physical Layer (PHY) channels are referred to as advertisers or advertising devices. Devices that receive advertising on the advertising channels without immediate intention to connect to the advertising device are referred to as scanners or scanning devices. Devices that form a connection to another device by listening for connectable advertising packets are referred to as initiators or initiator devices. Transmissions on the advertising PHY channels occur in advertising events. At the start of each advertising event, the advertiser sends an advertising packet corresponding to an advertising event type.

The initiator device that receives the advertising packet, may make a connect request (CONNECT_REQ) to the advertising device on the same advertising PHY channel. The advertising device accepting the CONNECT_REQ request results in establishing a point-to-point connection between the initiator device and the advertising device. The initiator device becomes a master device while the advertising device that becomes a slave device in a piconet. The master and the slave devices know at what time and in which frequency the connection is in operation. The data channel changes between every connection event and the start of connection events are spaced regularly with the connection interval that is provided in the CONNECT_REQ packet and that may be updated using a LL_CONNECTION_UPDATE_REQ packet.

The server device 120 and the beacon devices 110 may be employed in context of a service data provision arrangement or system, where the server device 120 provides the user device 130 with information regarding the beacon devices 110 that are arranged to provide service information that is likely interesting to the user of the user device 130. The service data provision arrangement may involve executing an associated client program (also referred to as a client application or a client app) in the user device 130 to and executing a respective server program (also referred to a server application or a server app) to carry out respective operations, procedures and/or functions of the data provision arrangement.

Figure 4:
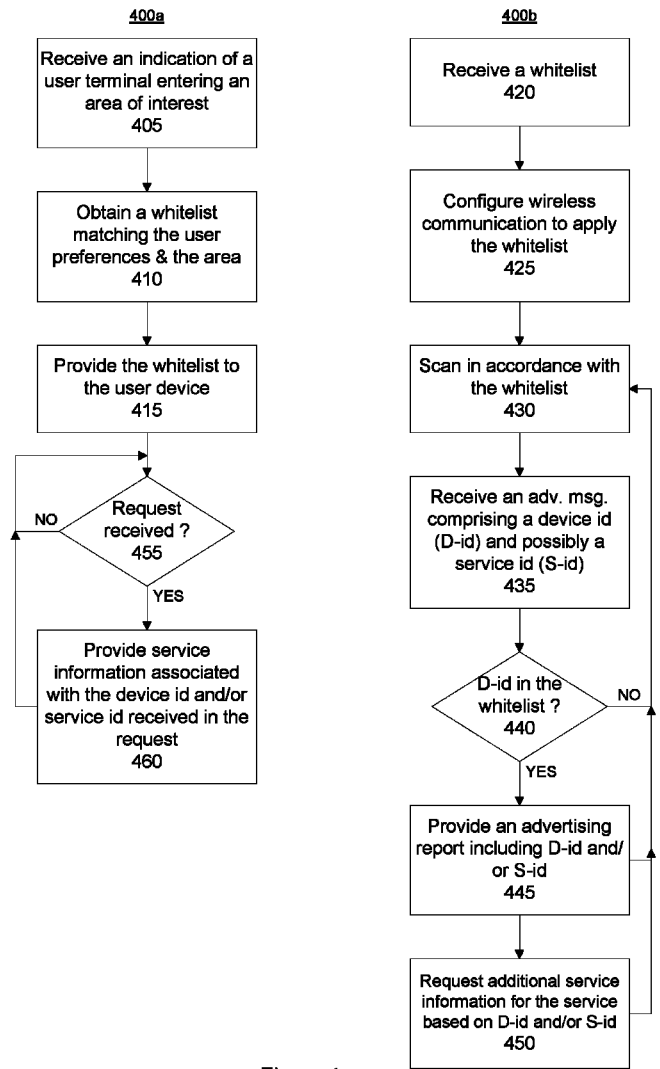
FIG. 4 illustrates methods according to example embodiments.

An exemplifying overview regarding operation of such a service data provision arrangement is provided in the following by describing exemplifying method(s) that may be carried out e.g. within the framework of the wireless communication arrangement 100. In this regard, FIG. 4 illustrates a method 400a serving as a method for providing whitelist information and a method 400b serving as a method for applying the whitelist information in acquisition of service data.

The operation (or 'execution') of the methods 400a and 400b may be preceded by activating the above-mentioned client application program and the server application program in the user device 130 and the server device 120, respectively. The method 400a may be carried out e.g. in the server 120 (e.g. as part of the operation of the server application program), whereas the method 400b may be carried out e.g. in the user device 130 (e.g. as part of the operation of the client application program).

To commence carrying out the method 400a, an indication of the user device 130 having entered the area/space of interest is received, as indicated in block 405. Consequently, the method 400a proceeds with obtaining a whitelist that corresponds to the user preferences in view of the service information available via beacon devices 110 arranged within or in immediate vicinity of the area/space of interest, as indicated in block 410. The whitelist includes device identifiers of beacon devices 110 that are arranged to broadcast service information pertaining to services matching pre-stored user preferences associated with the user device 130. The whitelist may be provided to the user device 130 via the second wireless communication portion 134, as indicated in block 415, to enable screening of information received from the beacon devices 110 via the (first) wireless communication portion 132.

The method 400b commences by receiving the whitelist, as indicated in block 420. The method 400b proceeds to configuring the (first) wireless communication portion 132 to apply the received whitelist, as indicated in block 425 and to start scanning for advertisement messages broadcast by the beacon devices 110 arranged in the area/space of interest in accordance with the whitelist, as indicated in block 430. Upon receiving, in the course of the scanning operation, an advertising message comprising a device identifier indicating the source of the advertising message and possible a service identifier specifying the advertised service (block 435), the method 400b proceeds to comparing the received device identifier with the device identifiers included in the whitelist, as indicated in block 440. In case the received device identifier is not included in the whitelist, the respective advertising message is ignored, whereas in case the received device identifier is included in the whitelist the method 400b proceeds to block 445 to notify the user device 130 regarding the received advertising message e.g. by issuing an advertising report comprising the device identifier received in the advertising message. The received advertising message may further comprise a service identifier. In such an arrangement the advertising report may comprise the service identifier instead of the device identifier or the advertising report may comprise both the device identifier and the service identifier. After processing the received advertising message (block 440 and 445) the method 400b continues from block 430 by scanning further advertisement messages.

Furthermore, in case of the advertising report having been issued, the method 400b may continue with the user device 130 sending a request for obtaining additional information regarding the service identified by the received device identifier and/or the received service identifier, as indicated in block 450. The request may be sent via the second wireless communication portion 134 to the server device 120 or to another entity. As further examples, the request may be sent to another entity via either of the wireless communication portions 132, 134, e.g. via the wireless communication portion 132 or via the second wireless communication portion 134 to the beacon device that provided the advertisement message that invoked the advertising report. After requesting the additional service information, the method 400b may proceed to block 430 to continue scanning in accordance with the whitelist. Consequently, the method 400a may continue, as indicated in block 460, by providing the additional service information pertaining to the service identified by the device identifier and/or the service identifier received in a request for additional information received (block 455) from the user device 130. After provision of the additional service information, the method 400a may proceed to block 455 to stand by for further requests for additional service information. When the user device 130 receives the additional information, it may be presented to the user of the user device 130 e.g. via the user interface 138.

The methods 400a and/or 400b may be varied in a number of ways, as will be described in the following in context of the wireless communication portion 112 (and/or the beacon device 110), in context of the wireless communication portion 132 (and/or the user device 130) and/or the server device 120. Although described as separate methods, the methods 400a and 400b, or any variations thereof, may be provided as a single method for providing and acquiring service information.

Within the framework of the wireless communication arrangement 100 (or its variations), the server device 120 may be configured to provide a list comprising allowable device identifiers to the user device 130 for reception via the second wireless communication portion 134. This list may be referred to, without losing generality, as a white list (or a whitelist).

The server device 120 may be configured to provide the whitelist, for example, in response to a request from the user device 130. Such a request may be manually invoked by the user of the user device e.g. by making a corresponding selection during execution of the aforementioned client application program via the user interface 138 or the request may be invoked e.g. in response to the user of the user device 130 activating the client application program and/or registering or signing in to the service data provision arrangement via the client application program.

Alternatively or additionally, the server device 120 may be configured to provide the whitelist in response to an indication regarding the user device 130 having entered the area/space of interest served by the beacon devices 110 and hence the user device 130 residing in or moving within this area/space can be assumed to be within operating range of at least some of the beacon devices 110. The server device 120 may be arranged to send the whitelist to the user device 130 only in case the user of the user device 130 has been registered or signed in to the above-mentioned service data provision arrangement.

The indication regarding the user device 130 entering or having entered the area/space of interest may be received e.g. from one or more of the wireless access points 140 arranged in or in vicinity of the area/space. The wireless access point(s) 140, in turn, may be arranged to provide the server device 120 with such an indication in response to detecting one or more signaling messages originating from the second wireless communication portion 134, which signaling message(s) comprise an identification of the second wireless communication portion 134 and/or an identification of the user device 130. As another example, in a variation where the second wireless communication portion 134 employs a cellular technology/protocol, the indication to the server device 120 may be provided by the base station of a wireless cellular communication network in response to having received one or more signaling messages from the from the second wireless communication portion 134. As a further example in this regard, predefined information that identifies one or more wireless access point(s) 140 and/or one or more base stations operating in or in vicinity of the area/space of interest may be stored in the user device 130, and the user device 130, e.g. the client application program, may be configured to provide the server device 120 with the indication regarding the user device 130 entering or having entered the area/space of interest in response to detecting one or more signaling messages originating from one of the wireless access points 140 or one of the base stations identified in the predefined information. The user device 130 may be configured to send the indication via the second wireless communication portion 134.

As a further example, the indication regarding the user device 130 entering or having entered the area/space of interest may be provided on basis GPS information extracted in the user device 130. In this regard, the user device 130 may employ a GPS receiver for determining the location of the user device 130, and the user device 130, e.g. the client application program, may be arranged to provide the server device 120 with an indication of the current location of the user device 130 according to a predefined schedule, e.g. at predefined (temporal) intervals. Alternatively or additionally, the user device 130, e.g. the client application program, may be configured to provide, via the user interface 138, the user with a possibility to indicate the current location to the server device 120. In such an arrangement the user device 130 may be configured to provide, via the second wireless communication portion 134, the indication of the current location of the user device 130 to the server device 120 in response to user making selection in this regard via the user interface 138. Consequently, the server device 120 may be arranged to compare the indication of the current location to predefined information stored therein that defines the area/space of interest. As another example in this regard, the predefined location information that defines the area/space of interest may be stored in the user device 130 and the user device 130, e.g. the client application program, may be configured to provide the server device 120 with the indication regarding the user device 130 entering or having entered the area/space of interest in response to the location information extracted in the user device 130 indicating location that is within or close to the area/space of interest. The user device 130 may be configured to send the indication via the second wireless communication portion 134.

The whitelist assigned for the user of the user device 130 may be prepared in view of preferences or interests indicated by the user of the user device 130. As an example, the user-preferences associated with the user device 130 may have been manually provided to the server device 120, e.g. by means of the client application program (via the user interface 138) or via a webpage that enables entering the user preferences to the service data provision arrangement for storing in (a memory accessible by) the server device 120 for subsequent use.

As another example of obtaining the user preferences, the server device 120 may be provided with access to a database storing user preferences obtained in context of another service and the server device 120 may be arranged to retrieve and store these use preferences for subsequent use in preparation of the whitelist. As an example, this may be a database (or portion thereof) storing user preferences in context of a social networking service, a customer database of an on-line store, a customer database of an internet service provider, a customer database of a telecommunications carrier, etc. to which the user of the user device 130 has granted access for the purpose of sharing information in context of the service data provision arrangement.

Each indicated user preference may be stored in the server apparatus 120 as one or more service identifiers corresponding to respective user preference. In other words, a single indicated user preference may map into one or more service identifiers. A service identifier may be defined and/or provided as a respective Universally Unique Identifier (UUID).

The server device 120 may be configured to apply a pre-stored whitelist assigned for the user device 130 and to transmit the pre-stored list to the user device 130 in response to the request or the indication calling for provision of the whitelist. The server device 120 may be configured to generate or update the pre-stored whitelist e.g. in response to receiving the user preferences and store the whitelist for subsequent provision to the user device 130. Instead of applying a pre-stored whitelist for the user device 130, the server device 120 may be configured to, in response to the request or the indication for provision of the whitelist to the user device 130, generate the whitelist on basis of the pre-stored user preferences and to transmit the generated whitelist to the user device 130.

Regardless of the event triggering the generation of the whitelist, the server device 120 may be configured to generate the whitelist by applying a predetermined mapping function associated with the beacon devices 110, which mapping function may be arranged to determine the mapping from all available user preferences to those beacon device(s) of the beacon devices 110 that are arranged to broadcast service information associated with respective available user preference. The generation of the whitelist may hence comprise the server device 120 configured to obtain (e.g. read from a memory) the pre-stored user preferences associated with the user device 130, to apply the mapping function to these pre-stored user preferences to determine the associated beacon devices 110, and to include device identifiers of the associated beacon devices 110 in the whitelist. Consequently, for some user preferences there may be no beacon devices 110 available in the area/space of interest, while for some user preference the mapping may result in one or more device identifiers to be inserted into the whitelist.

The predetermined mapping may between user preferences and device identifiers may be manually created and stored for subsequent use by the server device 120. Alternatively or additionally, the mapping may be created or complemented on basis of information obtained from the user device 130 or from other user devices, as will be described in more detail later in this text.

The predetermined mapping from user preferences to the device identifiers of the beacon devices 110 may be provided via one or more service identifiers associated with each of the device identifiers, such that a beacon information database stored in the server device 120 indicates for each service identifier the device identifiers of the beacon devices 110 that are arranged to provide service information pertaining to services corresponding to the respective service identifier. Alternatively or additionally, the server device 120 may store a service information database for mapping in the opposite direction by indicating for each device identifier of the beacon devices 110 the service identifiers pertaining to the service(s) advertised by the respective beacon device 110. To illustrate the mapping, information that may be stored in an exemplifying beacon information database is illustrated in the following table.

| Service ID | Device ID |
|---|---|
| Service A | Device 1, Device 4 |
| Service B | Device 1 |
| Service C | Device 2, Device 4 |
| Service D | — |
| Service E | Device 5 |

Corresponding information arranged into an exemplifying service information database is illustrated in the following.

| Device ID | Service ID |
|---|---|
| Device 1 | Service A, Service B |
| Device 2 | Service C |
| Device 3 | — |
| Device 4 | Service A, Service C |
| Device 5 | Service E |

The beacon information database may further store the additional service information pertaining to the services identified by service identifiers included in the beacon information database. As another example, a separate database for providing the mapping between service identifiers and the corresponding piece of additional service information may be provided in the server device 120. The server device 120 may be configured to provide this additional service information in response to a request, which request provides the device identifier and/or the service identifier that enable identification of the service of interest. This aspect will be described later in this text.

The operations, procedures and/or functions regarding the handling of whitelists described above in the server device 120 may be provided e.g. by the aforementioned server application program of the service data provision arrangement.

The whitelist typically comprises one or more list entries, each list entry comprising at least a device identifier of one of the beacon devices 110 matching the pre-stored user preferences associated with the user device 130. In a special case where none of the beacon devices indicate match with the pre-stored user preferences, the whitelist may be provided as an empty list. A list entry of the whitelist may comprise, in addition to the device identifier, one or more service identifiers associated with the device identifier of the same list entry.

Consequently, the list entries of the whitelist provide the list of device identifiers of the beacon devices 110 that provide service information pertaining to services matching the pre-stored user preferences associated with the user of the user device 130. In other words, the whitelist provides a list of allowable device identifiers, each of which may be considered to indicate information originating from a beacon device 110 arranged to provide information regarding a service of interest in view of the pre-stored user preferences associated with the user device 130. To further illustrate the content of the whitelist, exemplifying whitelist information based on the exemplifying service information database content described above for a user having indicated user preferences for services A, B and E would include the device identifiers indicated in the following table (in the first column), possibly together with the associated service identifiers (in the second column).

| Device 1 | (Service A, Service B) |
|---|---|
| Device 4 | (Service A) |
| Device 5 | (Service E) |

In case of the wireless communication portion 132 applying the BLE protocol, each device identifier may comprise the Bluetooth address of the wireless communication portion 112 of the corresponding beacon device 110. Furthermore, the service identifiers possibly included in the whitelist may be provided as respective UUIDs.

Consequently, the user device 130 may be configured to receive the whitelist via the second wireless communication portion 134, where the reception may take place e.g. as a response to an explicit request thereto or in response to the user device 130 having entered the area/space of interest (as described hereinbefore).

In the user device 130, the whitelist may be received and (initially) handled by the client application program. Moreover, the operations, procedures and/or functions assigned herein to the user device 130 in general without an explicit assignment to a dedicated component or portion of the user device 130 may be assumed to be carried out by the client application program of the service data provision arrangement or to be otherwise carried out in control of the client application program. The client application program may comprise one or more sequences of one or more instructions that are provided as part of the program code 137 stored in the memory 135 of the user device 130. The client application program may be considered to provide, when executed by the processor 136, a control portion or control function for (at least in part) controlling operation of the user device 130 and operation of the wireless communication portions 132, 134 in context of the service data provision arrangement.

The user device 130, e.g. the control portion, may be configured to provide the information provided in the whitelist to the wireless communication portion 132. This provision may be carried out e.g. directly between the control portion (of the user device 130) and the wireless communication portion 132 or the provision may take place via an operating system of the user device 130, e.g. via a host interface provided by the operating system. Without losing generality, the entity or entities of the user device 130 receiving information from and providing information to the wireless communication portion 132 may be jointly referred to as a host.

The provision of the information received in the whitelist to the wireless communication portion 132 may take place automatically in response to receiving the whitelist from the server device 120. As another example, the provision may be user initiated: the user device 130, e.g. the control portion, may be configured to indicate reception of the whitelist information to the user via the user interface 138 and to further provide the whitelist information to the wireless communication portion 132 in response to receiving a user selection in this regard via the user interface 138.

Provision of the whitelist information to the wireless communication portion 132 may comprise providing the whitelist in its entirety or selected pieces of information extracted therefrom from the host to the wireless communication portion 132 as one or more separate blocks of data. Such selected pieces of information may comprise e.g. the device identifier(s) included in the whitelist. As another example, each list entry of the whitelist may be handled separately, e.g. by providing the device identifiers included in the whitelist one at a time form the host to the wireless communication portion 132.

The wireless communication portion 132 is configured to store the whitelist information received from the host for use in subsequent scanning operation(s). Storing the whitelist information received from the host may comprise complementing an existing whitelist stored in the wireless communication portion 132 or replacing possible existing whitelist with the whitelist information received from the host.

Figure 5:
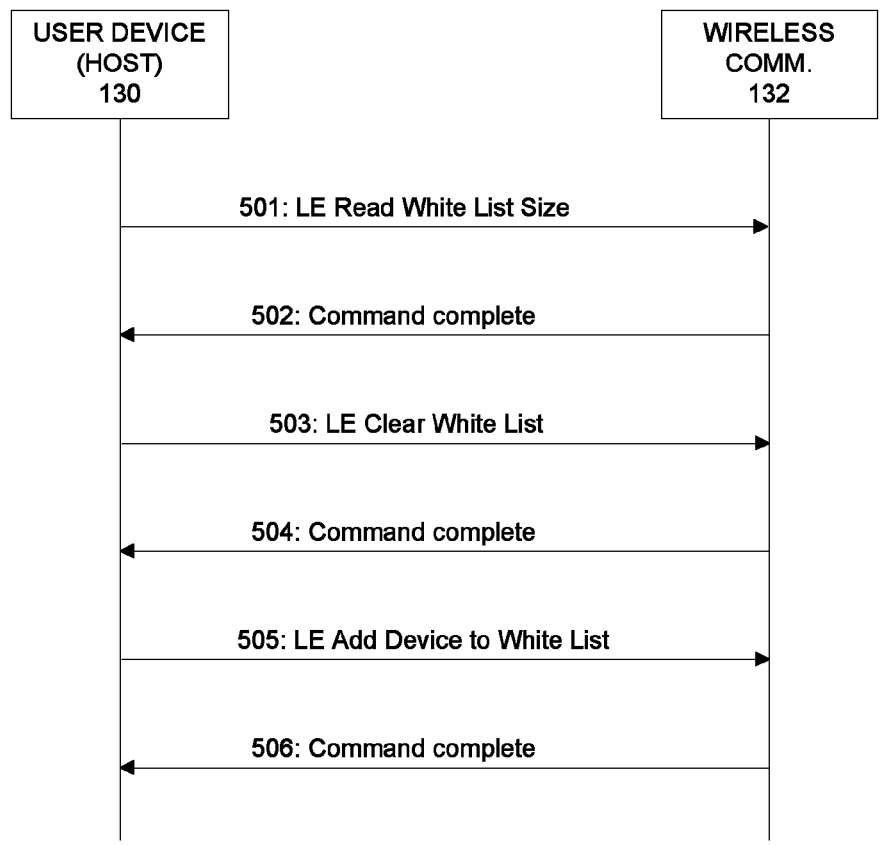
FIG. 5 illustrates an example of the exchange of information according to an example embodiment.

FIG. 5 illustrates an example of the exchange of information between the host and the wireless communication portion 132 in provision of the whitelist information from the host to the wireless communication portion 132 in a scenario where the wireless communication portion 132 is arranged to apply the BLE protocol. In step 501 the host issues the LE Read White List Size command to a controller (e.g. the control portion provided in the wireless communication portion 132), and in step 502 the wireless communication portion 132 (e.g. the controller) responds with an indication of the command having been completed. In step 503 the host issues the LE Clear White List command to the controller, and in step 504 the wireless communication portion 132 responds with an indication of the command having been completed. Finally, in step 505 the host issues the LE Add Device to White List command to provide the wireless communication portion 132 with the first device identifier (i.e. in this example a BLE device address) to be introduced in the whitelist, and in step 506 the wireless communication portion 132 responds with an indication of the command having been completed. The steps 505 and 506 are repeated for each device identifier included in the whitelist received from server device 120.

The wireless communication portion 132 may be configured to start, restart or re-configure scanning for advertising messages broadcast by the beacon devices 110 in accordance with the whitelist in response to receiving the whitelist from the host. As an example, this may involve the wireless communication portion 132 starting the scanning by changing from a stand-by state (or from an off state) to scanning state where scanning is applied according to a predetermined schedule, e.g. according to predetermined scanning intervals. As another example, this may involve the wireless communication portion 132 re-configuring the scanning by changing from a first scanning state to a second scanning state, which second scanning state applies shorter scanning intervals than the first scanning state.

The scanning operation in accordance with the whitelist may comprise the wireless communication portion 132 configured to ignore any advertising message comprising a device identifier that is not included in the whitelist. Consequently, the host is not provided with a notification, indication or report of the advertising message originating from a non-whitelisted wireless communication portion 112.

In contrast, the wireless communication portion 132 may be configured to provide the user device 110 with an advertising report (or an advertising indication or advertising notification) in response to receiving an advertising message comprising a device identifier included in the whitelist. The advertising report may comprise the received device identifier, a service identifier associated with received device identifier or both. Typically, although not necessarily, the service identifier is received in the advertising message and hence the wireless communication portion 132 may be configured to forward the received service identifier to the host in the advertising report. Such screening of advertising messages based on the device identifier serves to avoid disturbing the user of the user device 130 with indications concerning services that are not included in his/her pre-stored preferences.

As another example, the wireless communication portion 132 may have received one or more service identifiers associated with the allowable device identifiers as part of the whitelist information. Consequently, in response to receiving an advertising message comprising a device identifier included in the whitelist, the communication portion 132 may be further configured to compare the service identifier received in the advertising message to the service identifiers associated with the received device identifier in the whitelist information and to provide the user device 110 with an advertising report (including the service identifier) only in response to the received service identifier matching one of the service identifiers associated with the received device identifier in the whitelist information. Such screening of advertising messages based on the device identifier and further based on the service identifier serves to avoid disturbing the user of the user device 130 with indications concerning services that not included in his/her pre-stored preferences also in a scenario where a single beacon device 110 is arranged to advertise two or more services of different type.

Figure 6:
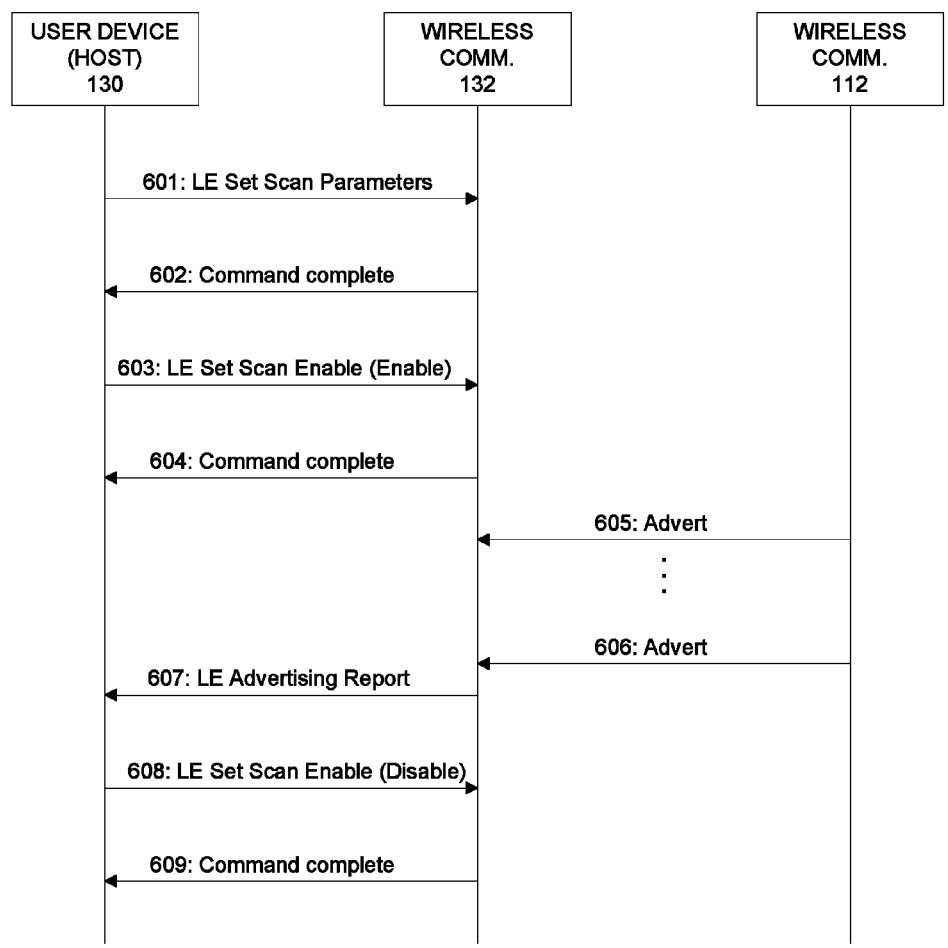
FIG. 6 illustrates an example of the exchange of information according to an example embodiment.

FIG. 6 illustrates an example of the exchange of information between the host (in the user device 130) and the wireless communication portion 132 and between the wireless communication 132 and the wireless communication portion 112 to initiate and carry out an exemplifying scanning operation in a scenario where the wireless communication portion 132 is arranged to apply the BLE protocol. In this example, for clarity of illustration, the wireless communication portion 112 shown in FIG. 6 represents the wireless communication portion 112 of any of the beacon devices 110. The example generalizes into other techniques or protocols as well, although the names and formats of the commands issued by the host may be different.

In step 601 the host (in the user device 130) issues the LE Set Scan Parameters command to the controller (e.g. the control portion provided in the wireless communication portion 132) to define characteristics of the scanning operation and in step 602 the wireless communication portion 132 (e.g. the controller) responds with an indication of the command having been completed. In step 603 the host issues the LE Set Scan Enable command to enable (e.g. initiate or re-start) the scanning operation, and in step 604 the wireless communication portion 132 responds with an indication of the command having been completed. The controller has now started the scanning operation. In step 605 the wireless communication portion 132 receives an advertisement message from wireless communication portion 112 whose device identifier (e.g. the BLE device address) is not included in the whitelist and, consequently, the wireless communication portion 132 does not inform the host about this advertisement message. In step 606 the wireless communication portion 132 receives an advertisement message from wireless communication portion 112 whose device identifier (e.g. the BLE device address) is included in the whitelist. Consequently, as indicated in step 607, the wireless communication portion 132 issues an advertising report to the host using the LE Advertising Report event. When there is no longer need to continue the scanning (e.g. due to the user device 130 having exited the area/space of interest), the scanning may be terminated. The scanning may be terminated e.g. in response to command provided by the user of the user device 130 via the user interface 138. As another example, the scanning may be terminated in response to finding a certain service (indicated e.g. by a predefined service identifier and/or a predefined device identifier) In this regard, in step 608 the host may issue the LE Set Scan Enable command to disable (terminate) the scanning operation in accordance with the whitelist, and in step 609 the wireless communication portion 132 responds with an indication of the command having been completed.

The control portion of the user device 130 (e.g. the client application program), may be configured to send or transmit a request for additional information regarding the service associated with (or identified by) the device identifier and/or the service identifier received in the advertising report. The target for the request for additional information, and hence the source of the additional information, may be e.g. the server device 120, the beacon device 110 identified by the device identifier included in the advertising report, or both. The request includes at least one of the received device identifier and the received service identifier in order to identify the service and hence enable the responding entity to respond with information pertaining to the service of interest. In case the target entity of the request for additional service information is the server device 120, the request is sent and the additional service information received via the second wireless communication portion 134. As another example, in case the target entity is the beacon device 110 that provided the advertising message that invoked the request for additional service information, the request may be send and the additional service information received via the wireless communication portion 132 or via the second wireless communication portion 134. In case the target entity is the beacon device 110, it may be further configured to store the service information database, the beacon information database and possibly a separate database that provides the mapping between service identifiers and the corresponding pieces of additional service information (i.e. the databases described hereinbefore in context of the server device 120) to enable mapping between the device identifier and/or the service identifier received in the request and the respective piece of additional service information.

The target entity for the request for additional service information is arranged to identify and obtain the additional service information associated with the device identifier and/or the service identifier received in the request for additional service information and send this information to the user device 130. In this regard, the target entity may be configured to apply e.g. the beacon information database and/or the service information database to identify the service, e.g. the service identifier, associated with the with device identifier and/or the service identifier received in the request and further configured to obtain the respective additional service information from a database (e.g. the beacon information database or the separate database storing the additional service information) for provision to the user device 130.

The provision of the request may take place automatically without further user involvement, e.g. the control portion may be arranged to automatically cause transmission of the request for additional service information in response to receiving the advertisement report. Alternatively, the request may be provided in response to an explicit user selection. As an example in this regard, the control portion may be arranged to cause indication regarding (additional) service information regarding a service pertaining to the pre-stored use preferences being available via the user interface 138, and further to cause transmitting the request in response to user making, via the user interface 138, a selection to retrieve the additional information regarding the advertised service. Once received, the user device 130 (e.g. the client application program) may be configured to present the additional service information to the user via the user interface 138.

As described hereinbefore, the mapping between user preferences and device identifiers of the beacon devices 110 may be created or complemented on basis of information obtained from the user device 130 or from other user devices. In this regard, the control portion of the user device 130 may be arranged to cause the wireless communication portion 132 to carry out scanning procedure within the area/space of interest without applying the whitelist in order to obtain information that may be used to create/complement the mapping. In such a scanning operation the wireless communication portion 132 is arranged to report each received advertising message to the host (e.g. to the control portion of the client device 130) by providing an advertising report comprising the device identifier and the service identifier(s) included in the advertising message. Consequently, the control portion is configured to provide this information, possibly together with information that indicates the services the user of the user device 130 has selected, to the server device 120 (e.g. via the second wireless communication portion 134). The server device 120 may use this information to create or complement the mapping information to be used for subsequent generation of the whitelist. The server device 120 may further (directly) apply this information to generate a whitelist according to user selection(s) the user and to subsequently map this kind of whitelist to the user of the user device 130 and/or to another user who may have similar preferences.

Each of the beacon device 110, the user device 130 and the server device 120 may be described as an entity or an apparatus comprising means for carrying out the operations, procedures, functions and/or methods described hereinbefore in context of the respective device. Such means may be provided as software means, as hardware means, or as a combination of software means and hardware means.

As an example in this regard, the user device 130 may be provided as an apparatus comprising first wireless means for short-range wireless communication, second wireless communication means for wireless communication, and control means for controlling the first and second wireless communication portions, wherein the control means is configured to provide, in response to receiving a list of allowable device identifiers from a remote server apparatus via the second wireless communication means, said list of allowable device identifiers to the first wireless communication means, and wherein the first wireless communication means is configured to provide, in response to receiving an advertising message comprising a device identifier included in said list of allowable device identifiers, the control means with an advertising report including at least one of the received device identifier and a service identifier associated with the received device identifier.

As another example in this regard, the server device 120 may be provided as an apparatus comprising means for obtaining pre-stored user preferences associated with a user apparatus, means for applying predetermined mapping between a predetermined set of device identifiers and corresponding possible user preferences to generate a list including those device identifiers that map to said pre-stored user preferences, and means for providing said list as a list of allowable device identifiers to the user apparatus in response to an indication regarding the user apparatus having entered an area of interest.

Figure 7:
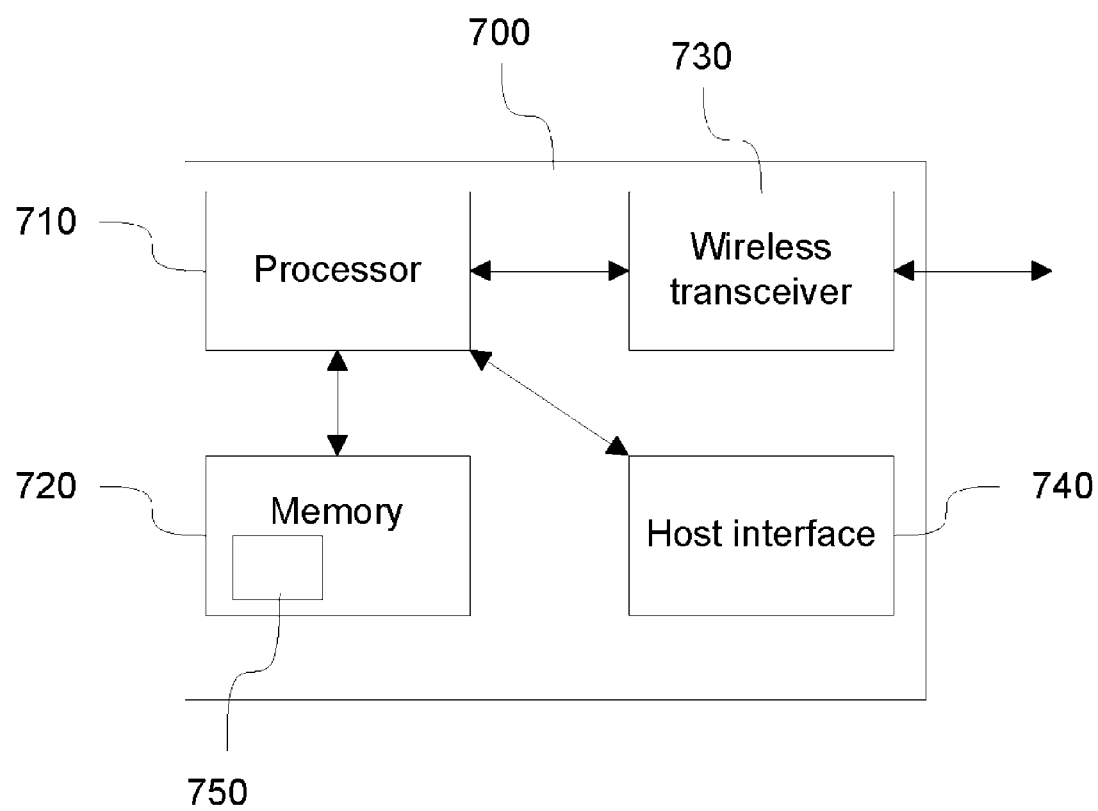
FIG. 7 schematically illustrates some components of an exemplifying apparatus in accordance with an example embodiment.

FIG. 7 schematically illustrates some components of an exemplifying apparatus 700 upon which an embodiment of the invention may be implemented. The apparatus 700 provides a diagram of exemplary components of an apparatus, which is capable of operating as or providing the wireless communication portion 132 according to an example embodiment. The apparatus 700 comprises a processor 710 and a memory 720. The processor 710 is configured to read from and write to the memory 720. The apparatus 700 further comprises a wireless transceiver 730 for communication with remote wireless transceivers of a corresponding type. The wireless transceiver 730 may apply e.g. the BLE protocol described hereinbefore as an exemplifying framework for embodying the present invention. The apparatus 700 may further comprise a host interface 740 for providing an interface to other components or entities hosting the apparatus 700, e.g. the advertising device 130. The apparatus 700 may comprise further components not illustrated in the example of FIG. 7.

Although the processor 710 is depicted as a single component, the processor 710 may be implemented as one or more separate components. Similarly, although the memory 720 is illustrated as a single component, the memory 720 may be implemented as one or more separate components, some or all of which may be integrated/removable and/or may provide permanent/semi-permanent/dynamic/cached storage.

The memory 720 may store a computer program 750 comprising computer-executable instructions that control the operation of the apparatus 700 when loaded into the processor 710. As an example, the computer program 750 may include one or more sequences of one or more instructions. The computer program 750 may be provided as a computer program code. The processor 710 is able to load and execute the computer program 750 by reading the one or more sequences of one or more instructions included therein from the memory 720. The one or more sequences of one or more instructions may be configured to, when executed by one or more processors, cause an apparatus, for example the apparatus 700, to carry out operations, procedures and/or functions described hereinbefore in context of the wireless communication portion 132 and/or in context of the user device 130.

Hence, the apparatus 700 may comprise at least one processor 710 and at least one memory 720 including computer program code for one or more programs, the at least one memory 720 and the computer program code configured to, with the at least one processor 710, cause the apparatus 700 to perform operations, procedures and/or functions described hereinbefore in context of the wireless communication portion 132 and/or in context of the user device 130.

The computer program 750 may be provided at the apparatus 700 via any suitable delivery mechanism. As an example, the delivery mechanism may comprise at least one computer readable non-transitory medium having program code stored thereon, the program code which when executed by the apparatus 700 cause the apparatus 700 at least to carry out operations, procedures and/or functions described hereinbefore in context of the wireless communication portion 132 and/or in context of the user device 130. The delivery mechanism may be for example a computer readable storage medium, a computer program product, a memory device a record medium such as a CD-ROM, a DVD, a Blu-ray disc or another article of manufacture that tangibly embodies the computer program 650. As a further example, the delivery mechanism may be a signal configured to reliably transfer the computer program 750.

Thus, the computer program 750 may be provided e.g. as a computer program product comprising at least one computer-readable non-transitory medium having program code stored thereon, the program code, when executed by an apparatus, e.g. the apparatus 700, causing the apparatus at least to perform operations, procedures and/or functions described hereinbefore in context of the wireless communication portion 132 and/or in context of the user device 130.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An apparatus comprising
at least one processor; and
at least one memory storing executable instructions that, with the at least one processor, cause the apparatus at least to:
cause a server to receive an indication that the apparatus has entered an area of interest,
based on causing the server to receive the indication that the apparatus has entered the area of interest, receive, from the server, a list of allowable device identifiers associated with the area of interest,
receive, via a first wireless communication that uses a first wireless communication protocol, an advertising message comprising a device identifier, and
based on determining that the device identifier is included on the list of allowable device identifiers, transmit, via a second wireless communication that uses a second wireless communication protocol, a request for additional information, the request comprising at least one of the device identifier or a service identifier associated with the device identifier.

2. An apparatus according claim 1, wherein the first wireless communication protocol comprises the Bluetooth Low Energy (BLE) protocol.

3. An apparatus according to claim 2, wherein the device identifier comprises a BLE address, and wherein the list of allowable device identifiers comprises a list of allowable BLE addresses.

4. An apparatus according to claim 1, wherein the second wireless communication protocol comprises a wireless local area network (WLAN) protocol or a cellular wireless communication protocol.

5. An apparatus according to claim 1, wherein the executable instructions, with the at least one processor, further cause the apparatus at least to:
start scanning for advertising messages in response to receiving the list of allowable device identifiers, and
stop the scanning based on determining that the apparatus has left the area of interest.

6. An apparatus according to claim 1, wherein the advertising message comprises the service identifier.

7. An apparatus according to claim 6,
wherein the list of allowable device identifiers comprises an associated service identifier for each allowable device identifier, and
wherein causing the apparatus to transmit the request is further based on the service identifier matching one of the associated service identifiers.

8. An apparatus according to claim 1, wherein the service identifier comprises a universally unique identifier (UUID).

9. An apparatus according to claim 1, wherein causing the apparatus to transmit the request comprises causing the apparatus to transmit the request to the server.

10. An apparatus according to claim 1, wherein causing the apparatus to transmit the request comprises causing the apparatus to transmit the request to a device identified by the device identifier.

11. A method comprising
causing a server to receive an indication that a computing device has entered an area of interest;
based on causing the server to receive the indication that the computing device has entered the area of interest, receiving, by the computing device and from the server, a list of allowable device identifiers associated with the area of interest;
receiving, by the computing device, via a first wireless communication that uses a first wireless communication protocol, an advertising message comprising a device identifier; and
based on determining that the device identifier is included on the list of allowable device identifiers, transmitting, by the computing device, via a second wireless communication that uses a second wireless communication protocol, a request for additional information, the request comprising at least one of the device identifier or a service identifier associated with the device identifier.

12. A method according claim 11, wherein the first wireless communication protocol comprises the Bluetooth Low Energy (BLE) protocol.

13. A method according to claim 12, wherein the device identifier comprises a BLE address, and wherein the list of allowable device identifies comprises a list of allowable BLE device addresses.

14. A method according to claim 11, wherein the second wireless communication protocol comprises a wireless local area network (WLAN) protocol or a cellular wireless communication protocol.

15. A method according to claim 11, further comprising:
starting scanning for advertising messages in response to receiving the list of allowable device identifiers; and
stopping the scanning based on determining that the computing device has left the area of interest.

16. A method according to claim 11, wherein the advertising message comprises the service identifier.

17. A method according to claim 16,
wherein the list of allowable device identifiers comprises an associated service identifier for each allowable device identifier, and
wherein transmitting the request is further based on the service identifier matching one of the associated service identifiers.

18. The method according to claim 11, wherein causing the server to receive the indication that the computing device has entered the area of interest is performed by the computing device transmitting, to the server, the indication that the computing device has entered the area of interest.

19. The method according to claim 11, wherein causing the server to receive the indication that the computing device has entered the area of interest is performed by the computing device transmitting, to a wireless access point associated with the area of interest, one or more signalling messages that comprise an identifier associated with the computing device.

20. One or more non-transitory computer-readable media storing executable instructions that, when executed by an apparatus, causes the apparatus at least to:
cause a server to receive an indication that the apparatus has entered the area of interest,
based on causing the server to receive the indication that the apparatus has entered the area of interest, receive, from the server, a list of allowable device identifiers associated with the area of interest,
receive, via a first wireless communication that uses a first wireless communication protocol, an advertising message comprising a device identifier, and
based on determining that the device identifier is included on the list of allowable device identifiers, transmit, via a second wireless communication that uses a second wireless communication protocol, a request for additional information, the request comprising at least one of the device identifier or a service identifier associated with the device identifier.

\* \* \* \* \*